May 12, 1953 — A. M. BORDERS — 2,638,462
COMPOSITIONS COMPRISING BLENDS OF RUBBERY AND
RESINOUS BUTADIENE-STYRENE COPOLYMERS
Filed Oct. 2, 1945
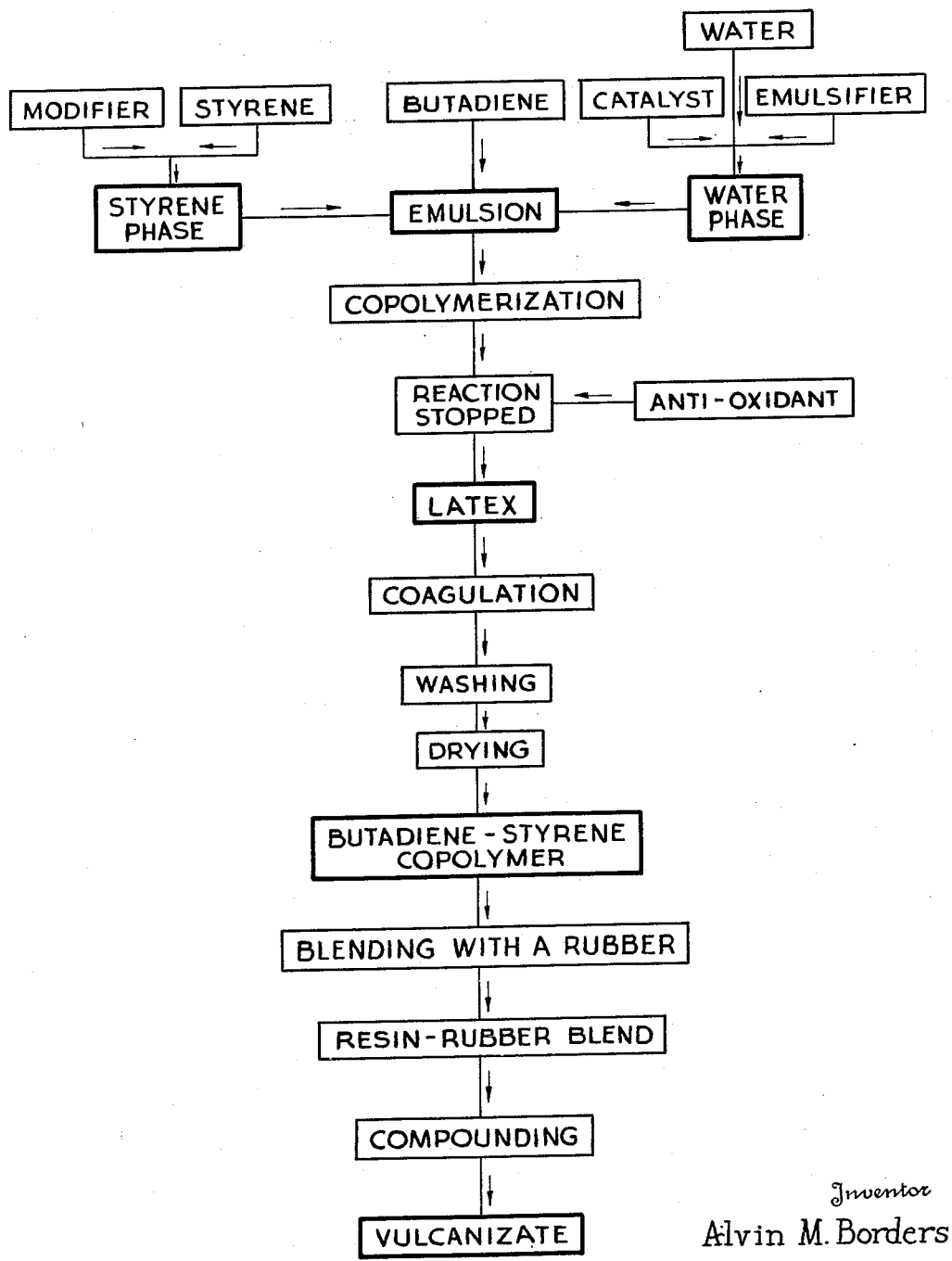
Inventor
Alvin M. Borders
Attorney Patented May 12, 1953

2,638,462

UNITED STATES PATENT OFFICE 2,638,462

COMPOSITIONS COMPRISING BLENDS OF RUBBERY AND RESINOUS BUTADIENE-STYRENE COPOLYMERS

Alvin M. Borders, Cuyahoga Falls, Ohio, assignor to Wingfoot Corporation, Akron, Ohio, a corporation of Delaware Application October 2, 1945, Serial No. 619,875

10 Claims. (Cl. 260—45.5)

This invention relates to a new chemical composition comprising a rubber and a resinous copolymer of a conjugated diene hydrocarbon monomer with a vinyl aromatic monomer in which the vinyl-aromatic monomer is present in a predominant amount, and more particular to a composition containing a synthetic rubber and a resinous copolymer of butadiene-1,3 and styrene in which the styrene is present in a predominant amount.

The drawing is a flow chart showing the process of producing the copolymer, the blend, and the vulcanizate of this invention.

Rubbers in general have certain characteristics which are found to be undesirable when used under certain conditions, for example, when used as a shoe sole material or when being extruded as a covering for an electrical conductor. The diene-vinyl resinous copolymer also has certain undesirable characteristics when so used and in fact may not be used successfully for shoe soles or wire insulation. It has now been discovered that when these two materials are compounded together a new chemical composition is formed which does not have the undesirable characteristics of either of its components and which does have characteristics which are not possessed by either of the starting components. Because of these characteristics this new composition is now finding use in the shoe sole industry and in the electrical insulation industry. Other uses are still to be explored.

For instance, it has been observed that soles made of rubber could not be made harder than about 75–80 Shore hardness by the use of ordinary rubber pigments and still produce a satisfactory sole material. However, when these rubbers are blended in the proper proportion with the resin component of this invention, the Shore hardness of the vulcanizate may be raised to 85 and even 100, the maximum value on the Shore hardness scale, at the same time having exceptional "feel," and being entirely satisfactory for shoe sole use. Any desired hardness may be obtained simply by adjusting the rubber-resin ratio.

In the past, rubbers of the type use in producing the novel blend of this invention have been pigment loaded for the purpose of improving their tensile and stretch characteristics. However, it has been found that comparable tensile and stretch characteristics are produced in the rubber when properly blended with the resin component of this blend by using from about 20 to about 80% less resin in comparison to the amount of pigment used.

Again, it has been observed that this new composition may be smoothly extruded in the non-vulcanized state in sheet form or in the form of a coating on wire, which sheet and coating has a smoothness far superior to that produced by rubber stiffened with ordinary rubber pigments.

The new chemical composition preferably comprises a blend of a synthetic rubber with a resinous copolymer of butadiene with styrene in which styrene is present in a predominant amount.

The synthetic rubber component of the blend is a copolymer resulting from the polymerization of a conjugated diene hydrocarbon monomer and a vinyl aromatic monomer in which the conjugated diene hydrocarbon is present in a predominant amount, a specific conjugated diene hydrocarbon being butadiene-1,3 and a specific vinyl aromatic monomer being styrene. In every case where butadiene is used, it is present in an amount sufficient to produce a rubbery material. Generally the amount will be one in excess of about 50% and desirably in amount between about 60 to about 95% by weight of the monomers being reacted.

The resinous component of this blend may vary from a hard, brittle resin to a stiff flexible material depending upon the diene monomer-vinyl aromatic monomer ratio present in the mixture polymerized. This resinous characteristic is present in the products resulting from the reaction of a mixture of a conjugated diene hydrocarbon monomer and a vinyl aromatic monomer when present in a ratio between about 30/70 to about 5/95.

The following description illustrates generally the preferred conditions to be employed in producing the resin component of this chemical composition. Generally, the copolymerization is carried out in the emulsion stage in which a styrene phase, including a modifier and styrene, is reacted with butadiene in the presence of a water phase, including a catalyst, an emulsifier and water. The copolymerization is continued at a temperature necessary to effect reaction of the styrene with the butadiene until the desired stage of hydrocarbon conversion has been attained. The resulting latex is then coagulated and the coagulum is washed and dried.

Where it is desired to stop the reaction at a certain percent hydrocarbon conversion value, an antioxidant is introduced into the latex in sufficient amount to terminate the reaction and to protect the resulting coagulum against deterioration by oxidation.

A more specific example involves the copolymerization of a styrene phase, including 85 parts of styrene and 0.1 part of dodecyl mercaptan with 15 parts of butadiene in the presence of a water phase, including 200 parts of water, 5.0 parts of sodium rosinate and 0.1 part of potassium persulfate at a temperature of 125° F. for a period of time until a latex solids content of 32.5% is obtained, after which 0.5% of phenyl beta naphthylamine is introduced into the reaction. The latex is precipitated by the addition of a 3% commercial alum solution, the resulting coagulum being washed with water and dried to produce a resin having a softening point of 63° C.

A modifier may be added to the styrene phase. Any suitable modifier may be used, as for example, the class of modifiers disclosed in U. S. 2,281,613, which may be generally referred to as mercaptans containing at least 6 carbon atoms, and particularly such mercaptans as isohexyl mercaptan, octadecyl mercaptan and preferably dodecyl mercaptan. Other desirable modifiers are those disclosed in U. S. 2,366,313, and generally referred to as the dialkyl polysulfides, specific examples of which are di(sec. butyl) disulfide, di(2-methyl butyl) disulfide, di(2-methyl pentyl) disulfide, and di(2-ethyl hexyl) disulfide. Another desirable class of modifiers are those described in U. S. 2,366,326, which may be generally referred to as the nitro diaryl polysulfides, specific examples of which are di-ortho-dinitro-phenyl-disulfide, di-p-nitro-phenyl-disulfide, and di-meta-nitro-phenyl disulfide. Another desirable class of modifiers that may be used are those described in U. S. 2,378,030, and which may be generally referred to as being the tertiary alkyl mercaptans, specific examples of which are tertiary dodecyl mercaptan, and particularly those mercaptans resulting from the reaction of hydrogen sulfide with such olefins as pinene, dipentene, dicyclo pentadiene, anethole, styrene, indene, n-dodecene, n-octane, and tri-isobutylene. Another desirable class of modifiers are those described in U. S. 2,248,107, which may be generally referred to as the dialkyl xanthogen disulfides, di(benzoic acid ester)-tetra sulfides, tolyl disulfide and tolyl trisulfide.

The modifier may be added in an amount between about 0.05% and about 3.0%, preferably in amount between about 0.08% and about 2.0%, and it has been found particularly desirable to use about 0.1% in each case on the combined weight of the aryl and diene components used. The modifier is added to the styrene and stirred so as to evenly disperse the same therein and, in the case of modifiers which are soluble in the styrene, to effect complete solution throughout the body of styrene. The modifiers act to regulate the solubility of the resulting resin in such compounds as benzene and toluene, and also regulates the degree of stiffness of the resin when formed into sheets. The greater the amount of modifier, the greater the solubility and the softer the resulting resin.

The water phase includes a catalyst, water and an emulsifier. Suitable catalysts that may be used are potassium persulfate, benzoyl peroxide, hydrogen peroxide, perborates and percarbonates. Other catalysts that may be used are those disclosed in U. S. 2,374,841, on page 2, column 1, lines 10-20.

The catalysts may be used in an amount between about 0.01% and about 1.0% and preferably are used in an amount between about 0.1% and about 1%.

Typical emulsifiers are those which may be generally referred to as the fatty acid soaps, as for example, sodium stearate and the rosin acid soaps, as for example sodium rosinate, alkali metal salts of alkyl sulfuric acid esters, as for example sodium lauryl sulfate, alkali metal salts of alkyl aryl sulfonates, as for example sodium dodecyl benzene sulfonate. Tallow soap is also useful. These emulsifiers may be used as such or the necessary reacting components may be added to the water phase in such a manner as to form the emulsifier in situ. The emulsifier may be present in an amount between about 1.5% and an amount necessary to bring about the proper suspension of the reacting materials and to form the proper emulsion. The upper limit may be as high as about 10% of emulsifier. A more desirable range of concentration of emulsifier is between about 3% and about 5%.

Water is present in an amount based upon the total amount of monomers being reacted and may be used in a monomer/water ratio between about 100/60 to about 100/200. A preferred monomer/water ratio range is that between about 100/180 and about 100/200.

The water phase containing the catalyst, water and emulsifier is run into a suitable reaction chamber, together with the styrene phase which includes styrene and the modifier, and then the butadiene is introduced into the reaction chamber under pressure and the mixture maintained at the desirable polymerization temperature for a period of time necessary to cause a substantially complete copolymerization of the butadiene and styrene. Generally the copolymerization is carried out at a temperature between about 20° C. and about 70° C. for a period of time between about 4 hours and about 100 hours, depending upon the percent conversion desired and depending upon the charged monomer ratio, the catalyst used and the type of monomers present.

The resulting latex may be coagulated by the addition of an alcohol, as for example methyl alcohol, isopropyl alcohol, etc. Commercial alum is also a desirable coagulant. Another desirable coagulant is a mixture of an acid and a salt, and particularly sulfuric acid and sodium chloride. Coagulation may also be brought about by the addition of a salt and alcohol mixture in which the salt is sodium chloride and the alcohol is methyl alcohol. Coagulation may also be effected by the addition of barium chloride alone, or barium chloride in admixture with an acid, magnesium chloride alone, calcium chloride alone, and mechanically by means of reducing the temperature of the latex to a point where the polymer particles drop out of the latex.

Generally the copolymerization is carried out at a temperature between about 20° C. and about 70° C. for a period of time between about 4 hours and about 100 hours, depending upon the percent conversion desired and depending upon the charged monomer ratio, the catalyst used and the type of monomers present.

The resin component of the composition of this invention may be generally characterized as thermoplastic, the softening point depending upon the monomer ratio used, the amount of modifier present, and percent hydrocarbon conversion obtained. The softening point may be varied over a considerable temperature range, using only small additional amounts of styrene. For example, the copolymer resulting from the copolymerization of a mixture of butadiene and styrene present in the ratio of 20/80 has a softening point of 38° C., while the addition of 5% more styrene and 5% less butadiene forms a copolymer having a softening point of 15° C. higher when made under the same conditions of reaction. The addition of 5% more styrene and 5% less butadiene produces a copolymer having a softening point of 17° C. higher than the preceding copolymer resulting from the copolymerization of a butadiene-styrene mixture of 15/85.

The rubber component of the blend of this invention is favorably stiffened when blended with the resin just described.

A synthetic rubber which is particularly improved is the one resulting from the copolymerization of butadiene-1,3 and styrene in which the butadiene-1,3 is present in a predominant amount, and particularly when the butadiene-styrene ratio ranges from about 60/40 to about 85/15. It is desirable to emphasize at this point that the blending of the resinous copolymer of styrene and butadiene with the rubbery copolymer of styrene and butadiene produces a composition having characteristics entirely different from the copolymer resulting from the copolymerization of a mixture of styrene and butadiene in which the styrene and butadiene contents of both are the same.

Desirable effects are produced on the synthetic rubber using a resin to rubber ratio between about 5/95 to about 75/25. The degree of stiffening produced will depend of course upon the amount of resin used. The following examples are typical of the stiffening that may be produced on GR-S:

| Example | Rubber | Resin | Resin/Rubber Ratio | Olsen Stiffness (lbs.)[3] |
|---|---|---|---|---|
| 1 | Gr-S [1] | P-Resin [2] | 0/100 | 0. |
| 2 | Gr-S [1] | P-Resin [2] | 10/90 | 0.016 |
| 3 | Gr-S [1] | P-Resin [2] | 30/70 | 0.021 |
| 4 | Gr-S [1] | P-Resin [2] | 50/50 | 0.215 |
| 5 | Gr-S [1] | P-Resin [2] | 70/30 | 0.91 |
| 6 | Gr-S [1] | P-Resin [2] | 90/10 | 2.40 |

[1] 75/25 butadiene/styrene rubber.
[2] 15/85 butadiene/styrene resin.
[3] Using the test method described by A. S. T. M. Designation D747-43T.

The composition of this invention particularly those of the examples may be compounded with the usual rubber compounding ingredients and vulcanized in the usual manner to produce a vulcanizate having properties that are not found when the rubber component alone or the resin component alone of this composition are compounded and vulcanized under the same conditions.

The resin component mixes or blends readily with the rubber, regardless of the amount used. The usual blending operation is conducted in a Banbury mill in which the rubber is first added, and after a few minutes breakdown, the resin is added in a small amount until the batch is heated to a temperature of between about 200° F. and about 225° F., and then the remaining resin is added. In order to facilitate blending a peptizing agent for example naphthyl-beta-mercaptan may be added to the rubber before the resin is added. When blending is done on an open mill, the resin is placed on the rolls and a band is formed to which the rubber is then added and the batch worked by cutting back and forth until the material is blended, after which the regular milling procedure is followed which involves the addition of the necessary amounts of a vulcanization accelerator, fillers, inhibitors, antioxidants, sulfur, etc. Blending may also be accomplished by mixing the latices of the rubber and the resin and coagulated in the usual manner.

Suitable changes may be made in the details of the process without departing from the spirit or scope of the present invention, the proper limits of which are defined in the appended claims.

I claim:

1. A composition of matter comprising 90-50 parts of a rubbery emulsion copolymer of a major proportion of butadiene and a minor proportion of styrene; in admixture with 10-50 parts of a hard, benzene-soluble, thermoplastic resin obtained by copolymerizing a mixture of 75-85 weight percent of styrene and 25 to 15 weight percent of butadiene at a temperature between 35 and 70° C. in aqueous emulsion in the presence of an aliphatic mercaptan of 7 to 18 carbon atoms; the composition of matter being hard, thermoplastic, and readily extrudable.

2. An unvulcanized vulcanizable composition of matter comprising 90-50 parts of a rubbery copolymer of a major proportion of butadiene of a minor proportion of styrene in admixture with 10-50 parts of a hard, thermoplastic resin obtained by copolymerizing a mixture of 70-95 weight percent of styrene and 30-5 weight percent of butadiene in aqueous emulsion in the presence of a substance which promotes the solubility of the resulting resin in benzene and selected from the group consisting of mercaptans containing at least 6 carbon atoms, dialkyl polysulfides, nitro diaryl polysulfides and dialkyl xanthogen disulfides.

3. An unvulcanized vulcanizable composition of matter comprising 90-50 parts of a rubbery copolymer of a major proportion of butadiene and a minor proportion of styrene in admixture with 10-50 parts of a hard, thermoplastic resin obtained by copolymerizing a mixture of 70-95 weight percent of styrene and 30-5 weight percent of butadiene in aqueous emulsion in the presence of a mercaptan containing at least 6 carbon atoms which promotes the solubility of the resulting resin in benzene.

4. An unvulcanized vulcanizable composition of matter comprising 90-50 parts of a rubbery copolymer of a major proportion of butadiene and a minor proportion of styrene in admixture with 10-50 parts of a hard, thermoplastic resin obtained by copolymerizing a mixture of 70-95 weight percent of styrene and 30-5 weight percent of butadiene in aqueous emulsion in the presence of an aliphatic mercaptan having 7 to 18 carbon atoms which promotes the solubility of the resulting resin in benzene.

5. An unvulcanized vulcanizable composition of matter comprising about 70 parts of a rubbery copolymer of a major proportion of butadiene and a minor proportion of styrene in admixture with about 30 parts of a hard, thermoplastic resin obtained by copolymerizing a mixture of 70-95 weight percent of styrene and 30-5 weight percent of butadiene in aqueous emulsion in the presence of a substance which promotes the solubility of the resulting resin in benzene and selected from the group consisting of mercaptans containing at least 6 carbon atoms, dialkyl polysulfides, nitro diaryl polysulfides, and dialkyl xanthogen disulfides.

6. An unvulcanized vulcanizable composition of matter comprising about 70 parts of a rubbery copolymer of a major proportion of butadiene and a minor proportion of styrene in admixture with about 30 parts of a hard, thermoplastic resin obtained by copolymerizing a mixture of 70-95 weight percent of styrene and 30-5 weight percent of butadiene in aqueous emulsion in the presence of an aliphatic mercaptan having 7 to 18 carbon atoms which promotes the solubility of the resulting resin in benzene.

7. An unvulcanized vulcanizable composition of matter comprising 90-50 parts of a rubbery copolymer of a major proportion of butadiene and a minor proportion of styrene in admixture with 10-50 parts of a hard, thermoplastic resin obtained by copolymerizing a mixture of about 85 weight percent of styrene and about 15 weight percent of butadiene in aqueous emulsion in the presence of a substance which promotes the solubility of the resulting resin in benzene and selected from the group consisting of mercaptans containing at least 6 carbon atoms, dialkyl polysulfides, nitro diaryl polysulfides, and dialkyl xanthogen disulfides.

8. An unvulcanized vulcanizable composition of matter comprising 90-50 parts of a rubbery copolymer of a major proportion of butadiene and a minor proportion of styrene in admixture with 10-50 parts of a hard, thermoplastic resin obtained by copolymerizing a mixture of about 85 weight percent of styrene and about 15 weight percent of butadiene in aqueous emulsion in the presence of an aliphatic mercaptan having 7 to 18 carbon atoms which promotes the solubility of the resulting resin in benzene.

9. An unvulcanized vulcanizable composition of matter comprising about 70 parts of a rubbery copolymer of a major proportion of butadiene and a minor proportion of styrene in admixture with about 30 parts of a hard, thermoplastic resin obtained by copolymerizing a mixture of about 85 weight percent of styrene and about 15 weight percent of butadiene in aqueous emulsion in the presence of a substance which promotes the solubility of the resulting resin in benzene and selected from the group consisting of mercaptans containing at least 6 carbon atoms, dialkyl polysulfides, nitro diaryl polysulfides, and dialkyl xanthogen disulfides.

10. An unvulcanized vulcanizable composition of matter comprising about 70 parts of a rubbery copolymer of a major proportion of butadiene and a minor proportion of styrene in admixture with about 30 parts of a hard, thermoplastic resin obtained by copolymerizing a mixture of about 85 weight percent of styrene and about 15 weight percent of butadiene in aqueous emulsion in the presence of an aliphatic mercaptan having 7 to 18 carbon atoms which promotes the solubility of the resulting resin in benzene.

ALVIN M. BORDERS.

References Cited in the file of this patent

UNITED STATES PATENTS

| Number | Name | Date |
|---|---|---|
| 2,393,208 | Waterman et al. | Jan. 15, 1946 |
| 2,414,803 | D'Alelio | Jan. 28, 1947 |
| 2,419,202 | D'Alelio | Apr. 22, 1947 |
| 2,452,999 | Daly | Nov. 2, 1948 |
| 2,477,316 | Sparks et al. | July 26, 1949 |
| 2,541,748 | Daly | Feb. 13, 1951 |

FOREIGN PATENTS

| Number | Country | Date |
|---|---|---|
| 345,939 | Great Britain | Mar. 16, 1931 |

OTHER REFERENCES

"Marbon S and S-1 Resins," pub. Dec. 28, 1944 by Gary, Indiana, 8 pages plus title page and letter on inside front cover (total 10 pages).

Susie et al., Rubber Age, August 1949, pages 537-540.

Rubber Age, Nov. 1947, page 200.

Modern Plastics, February 1947, pp. 100-102.

India Rubber World, January 1945, p. 422.

India Rubber World, February 1945, p. 590.